Aug. 11, 1942.          R. V. FORD          2,292,687
SAFETYPIN
Filed April 19, 1941
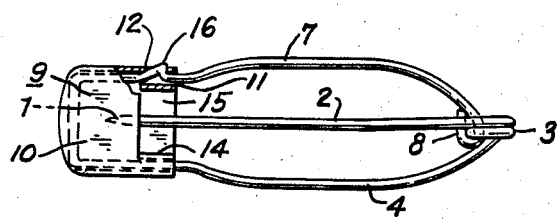
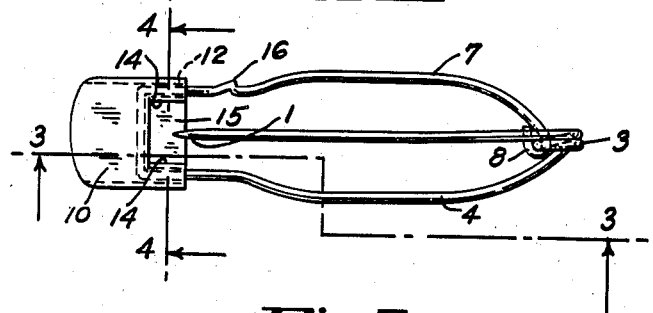
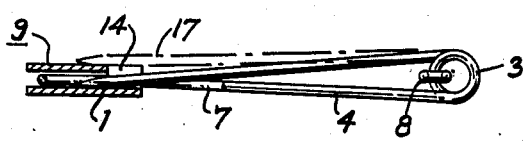
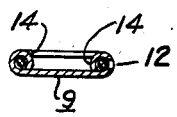
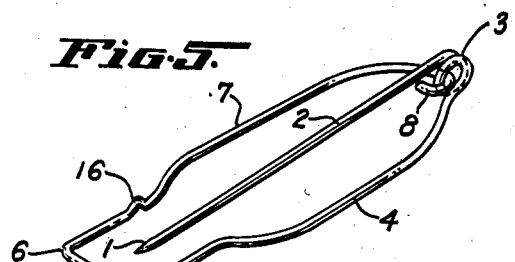
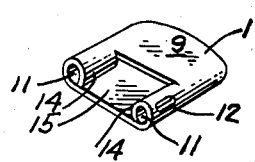
INVENTOR.
ROBERT V. FORD
BY
ATTORNEYS.

Patented Aug. 11, 1942

2,292,687

UNITED STATES PATENT OFFICE 2,292,687

SAFETYPIN

Robert V. Ford, San Francisco, Calif.

Application April 19, 1941, Serial No. 389,376

2 Claims. (Cl. 24—158)

My invention relates to safety pins and more particularly to a safety pin which can be locked in closed position and wherein the point of the pin is guarded at all times.

The main object of my invention is to provide a safety pin which may be readily opened, locked in closed position, and wherein the point is at all times guarded.

The present invention embodies the locking feature shown, described, and claimed in my prior Patent No. 2,079,162, issued May 4, 1937, and is an improvement thereon.

Other objects of my invention will be apparent or will be specifically pointed out in the description forming a part of this specification, but I do not limit myself to the embodiment of the invention herein described, as various forms may be adopted within the scope of the claims.

In the drawing:

Fig. 1 is a side elevation of one form of my invention with a portion thereof cut away and shown in section. In this figure, the pin is locked.

Fig. 2 is a side elevation of the device of my invention with the pin unlocked.

Fig. 3 is a view partly in elevation and partly in section of the device of Figs. 1 and 2, rotated 90°.

Fig. 4 is a sectional view taken as indicated by the line 404 in Fig. 2.

Fig. 5 is a perspective view of the cowl utilized as a portion of my invention.

Fig. 6 is a perspective view of the wire portion of the pin of my invention.

In the majority of safety pins and in my prior safety pin referred to above, the point of the safety pin, when the device is unlocked, is usually spring pressed to extend away from the main body of the pin and to expose the point. In the present invention the point is spring pressed to keep the point at all times in contact with the cowl of the pin, thus protecting the point and rendering the pin much less dangerous in case it is swallowed, as often happens with children.

Referring directly to the drawing for a more detailed description of my invention:

The main body of my pin is formed from a single piece of wire and by first referring to Fig. 6 which shows the wire portion alone, it will be seen that one end of the wire is provided with a point 1 followed by straight pin portion 2. The wire is then wound into spring loops 3 and emerges from the spring loops to form one side member 4 having a generally convex curvature extending in the direction of the straight portion 2. Slightly beyond point 1 the wire is formed with two substantially rectangular bends 5 and 6 and then is formed into an opposite side member 7 in the same plane as, shaped similarly to, but oppositely convex to side member 4. The other end of the wire terminates in a retaining loop 8 passed through spring loops 3. Spring loops 3 are stressed so that in normal position point 1 is in the plane of side members 4 and 7 and bends 5 and 6.

A cowl 9 (or casing) is provided as shown in Fig. 5, this cowl comprising a hollow end portion 10 and lateral wire retaining bearings 11, one of these bearings being provided with an aperture 12 on the edge of the cowl 9. This cowl is applied to the wire as shown in Figs. 1, 2, and 3. In making the pin, the inner portions 14 of the bearings 11 are left open and the rectangular bends 5 and 6 inserted inside the cowl. Portions 14 are then bent around the wire so that the wire may slide within the cowl between the ends thereof and the bearings, the extreme positions being shown in Figs. 1 and 2. The straight portion 2 of the wire is made sufficiently long so that when the rectangular bends 5 and 6 of the wire are against the end of the cowl, the point will be within the end portion 10 of the cowl, but when the cowl is moved outwardly with respect to the wire so that bends 5 and 6 contact bearings 10 and 11, as shown in Fig. 2, the point is then free of the cowl and the straight portion may be opened against the spring of loops 3. The spring in loops 3 at all times tends to hold the point against the exposed inner surface 15 of the cowl.

In order that the cowl and the wire may be locked together with the point within the portion 10 of the cowl, I provide a projection 16 on the wire in a position where this projection 16 will enter aperture 12 in the cowl when the point is within the end portion 10 of the cowl as shown in Fig. 1. In this position the pin is safely locked with the point 1 covered. In order to open the pin, the side members 7 and 4 are pressed together to remove projection 16 from aperture 12, and the cowl may then be pulled outwardly to free the point 1 as shown in Fig. 2. The pin may then be used by forcing the straight portion 2 open, engaging the cloth or other material it is desired to fasten, whereupon the spring of loop 3 closes the pin. The cowl may then be pushed toward the wire to lock the pin.

It will thus be seen that I have provided a pin which may be unlocked for use and thereafter locked with the point buried, but in which the point is at all times spring pressed against the cowl so that even when unlocked, no point is exposed. It will also be noticed that even if the cowl should be locked on the wire with the point 1 outside of the cowl, as shown by the dotted line 17 in Fig. 3, the point is spring pressed against the outside of the cowl and, therefore, even if swallowed in this condition, would not be dangerous to the person who swallowed it, except as an obstruction. The point would still be prevented from entering tissue.

I claim:

1. A safety pin comprising a wire having two side parts connected by a U-shaped bend, one of said side parts being continued as spring loops at right angles to the plane of said side parts and having a pin portion continuing as a straight pin portion extending toward said U-shaped portion midway between said side parts, terminating in a point, the end of the other side part being attached to said loops, and a hollow cowl slidably confined on said U-shaped bend, one side of said cowl between the U-shaped bend extending further toward said spring loops than the other, said pin being stressed by said spring loop to hold the point of said pin against the extended side of said cowl in all positions of said cowl, said cowl being movable to enclose said point in one position and to free said point for movement past the shorter side of said cowl against the stress of said spring loop in another position.

2. A safety pin as recited in claim 1 wherein a projection is formed on one leg of said bend engaging an aperture in said cowl for preventing movement of said cowl on said bend when said point is in said cowl and wherein said bend may be flexed to free said projection from said aperture only by pressure against said side parts.

ROBERT V. FORD.